(12) United States Patent
Shen

(10) Patent No.: US 7,876,392 B2
(45) Date of Patent: Jan. 25, 2011

(54) LIQUID CRYSTAL DISPLAY AND HEIGHT ADJUSTABLE BASE OF THE PANEL THEREOF

(75) Inventor: Hsiu-Mei Shen, Hsin Tien (TW)

(73) Assignee: United Fu Shen Technology Corp., Hsin Tien (TW)

( * ) Notice: Subject to any disclaimer, the term of this patent is extended or adjusted under 35 U.S.C. 154(b) by 181 days.

(21) Appl. No.: 12/253,364

(22) Filed: Oct. 17, 2008

(65) Prior Publication Data
US 2010/0097540 A1    Apr. 22, 2010

(51) Int. Cl.
*G02F 1/1333* (2006.01)
(52) U.S. Cl. .......................... 349/60; 349/58; 248/146; 248/276.1
(58) Field of Classification Search ........................ None
See application file for complete search history.

(56) References Cited

U.S. PATENT DOCUMENTS

| 6,381,125 | B1 * | 4/2002 | Mizoguchi et al. ..... 361/679.08 |
| 6,905,099 | B2 * | 6/2005 | Sung .......................... 248/146 |
| 7,093,725 | B2 * | 8/2006 | Hartman et al. ............... 211/26 |
| 7,227,598 | B2 * | 6/2007 | Chin ............................ 349/60 |
| 2004/0084585 | A1 * | 5/2004 | Watanabe et al. ......... 248/276.1 |
| 2006/0158578 | A1 * | 7/2006 | Tsuo ........................... 349/58 |

* cited by examiner

*Primary Examiner*—Tina M Wong

(57) ABSTRACT

A liquid crystal display includes a liquid crystal panel and a height adjustable base. The height adjustable base further includes a main base, a fixing frame and an elastic locating device. The main base provides at least a sliding rail, which has a stationary member attached to the main base and a movable member capable of sliding along the stationary member. The fixing frame is connected to the movable member for being mounted with the liquid crystal panel. The elastic locating device provides an acting end, which is disposed against the fixing frame for supplying an elastic ascending force to the fixing frame, and a joining end, which is detachably connected to the main base with an elastic coupling force for restoring the elastic ascending force automatically. Therefore, the liquid crystal display can be simply operated to release or restore the ascending elastic force needed at the time of height adjusting the liquid crystal panel.

6 Claims, 7 Drawing Sheets

LIQUID CRYSTAL DISPLAY AND HEIGHT ADJUSTABLE BASE OF THE PANEL THEREOF

BACKGROUND OF THE INVENTION

1. Field of the Invention

The present invention is related to a liquid crystal display and particularly to liquid crystal display with a height adjustable base for the panel thereof capable of releasing or restoring an elastic ascending force needed by the lifted operation with an elastic locating device provided for the liquid crystal display.

2. Brief Description of the Related Art

Due to information technology being developed progressively, the monitor with screen display is widely applied for showing pictures such as graphical images. The traditional cathode ray tub (CRT), which has been popularly used for a long time, has been largely replaced with the liquid crystal display (LCD), which is light in weight and thin in thickness.

When the liquid crystal display is placed on the desktop for the liquid crystal panel thereof being adjusted to lift a height or to incline an angular position based on the preference of the user, an adjustment device is arranged to meet the need of the user's comfort.

The conventional liquid crystal display provides a height adjustable base for adjusting the liquid crystal panel and a locating spring is arranged to supply an elastic ascending force to lift the liquid crystal panel. However, the height adjustable base is operated to locate the liquid crystal panel by means of balancing the gravity of the liquid crystal display and the elastic ascending force of the locating spring such that the liquid crystal panel can only be operated to ascend or descend at the time of the liquid crystal display being used at a normal condition. When the liquid crystal display is packed for delivery, the liquid crystal panel is disposed at the lowest position as possible under a condition of the torsion of the locating spring being released. In this way, the liquid crystal panel is easy to bounce out suddenly to hurt people at the time of the liquid crystal display is unpacked.

SUMMARY OF THE INVENTION

Accordingly, an object of the present invention is to provide a liquid crystal display with a height adjustable base for a liquid crystal panel thereof which provides an elastic locating device to release or restore an elastic ascending force needed by the operation of lifting the liquid crystal panel such that it is capable of preventing the liquid crystal panel from bouncing out suddenly at the time of unpacking and it is easy for restoring the lifted operation automatically.

In order to achieve the preceding object, a liquid crystal display according to the present invention includes a liquid crystal display and a height adjustable base and the height adjustable base further includes a main base, a fixing frame and an elastic locating device.

Wherein, the main base provides at least a sliding rail, which has a stationary member attached to the main base and a movable member capable of sliding along the stationary member; the fixing frame is connected to the movable member for being mounted with the liquid crystal panel; and the elastic locating device provides an acting end, which is disposed against the fixing frame for supplying an elastic ascending force to the fixing frame, and a joining end, which is detachably connected to the main base with an elastic coupling force for restoring the elastic ascending force automatically.

In a preferred embodiment of the present invention, the fixing frame further comprises a frame member fastened to the movable member with a stop-rotation shaft hole; a spring locating seat attached the lower side of the frame member for being joined to the acting end of the elastic locating device; a shaft passing through the stop-rotation shaft hole to connect with said frame member; a brake device disposed next to said frame member; and a fixing plate member being braked with the brake device and rotationally connected to the shaft such that the fixing frame is capable of rotating with respect to the main base to adjust the angular displacement of the liquid crystal panel relative to the main base in addition to the liquid crystal panel moving upward or downward with respect to the main base.

In the preferred embodiment of the present invention, the main base has an engaging hole and the elastic locating device further comprises a spring force releasing base with a central through hole and two threaded holes; a locating sheet spring having a middle hole and two side holes at the acting end for supplying the elastic ascending force; a sliding pin base providing a locating pin and two base holes; two coil springs for supplying the elastic coupling force; and two screws passing through the two coil springs, the two base holes, the two threaded holes and the side holes for engaging with the two threaded holes respectively.

In the preferred embodiment of the present invention, when the liquid crystal display is in a state of normal use, the locating pin is capable of passing through the middle hole of the locating sheet spring, the central through hole of the spring force releasing base and the engaging hole of the main base to connect with the main base. At this time, if the liquid crystal panel is operated to ascend or descend, in addition to the fixing frame moving along the stationary member with the movable member, the locating pin, which is disposed at the joining end of the elastic locating device, is incapable of moving because of being joined to the engaging hole; but the acting end of the locating sheet spring of the elastic locating device is capable of moving along with the movable member due to being disposed against the spring locating seat such that the elastic ascending force can be provided to balance the gravity of the liquid crystal panel for the liquid crystal panel being able to be operated to move upward or downward normally.

In the preferred embodiment of the present invention, when the liquid crystal display is packed, the locating pin of the elastic locating device can be disengaged from the engaging hole of the main base with a tool to achieve the purpose of disengagement. Meanwhile, if fixing frame is operated to ascend or descend the liquid crystal panel, the entire elastic locating device is capable of moving with the frame member to release the elastic ascending force of the locating sheet spring such that the liquid crystal panel is incapable of bouncing out accidentally to hurt people at the time of the liquid crystal device being unpacked.

In the preferred embodiment of the present invention, when the liquid crystal display is unpacked, the liquid crystal panel can be pushed to move upward to the top end for the locating pin of the locating elastic locating device aligning with the engaging hole of the main base such that the elastic forces of the two coil springs of the elastic locating device push the locating pin into the engaging hole to engage with the main base and restore the function of lifting automatically.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
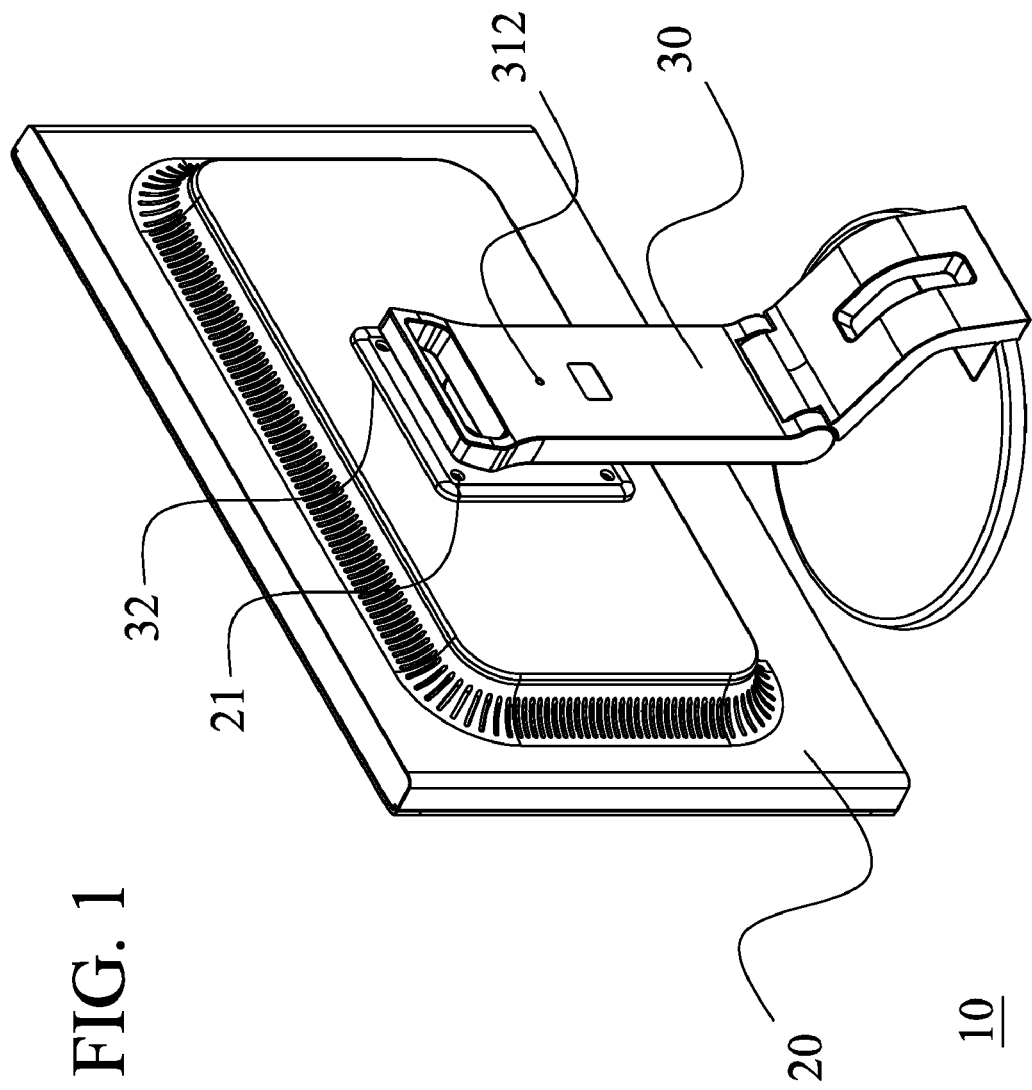
FIG. 1 is a perspective view of a liquid crystal display according to the present invention.
Figure 2:
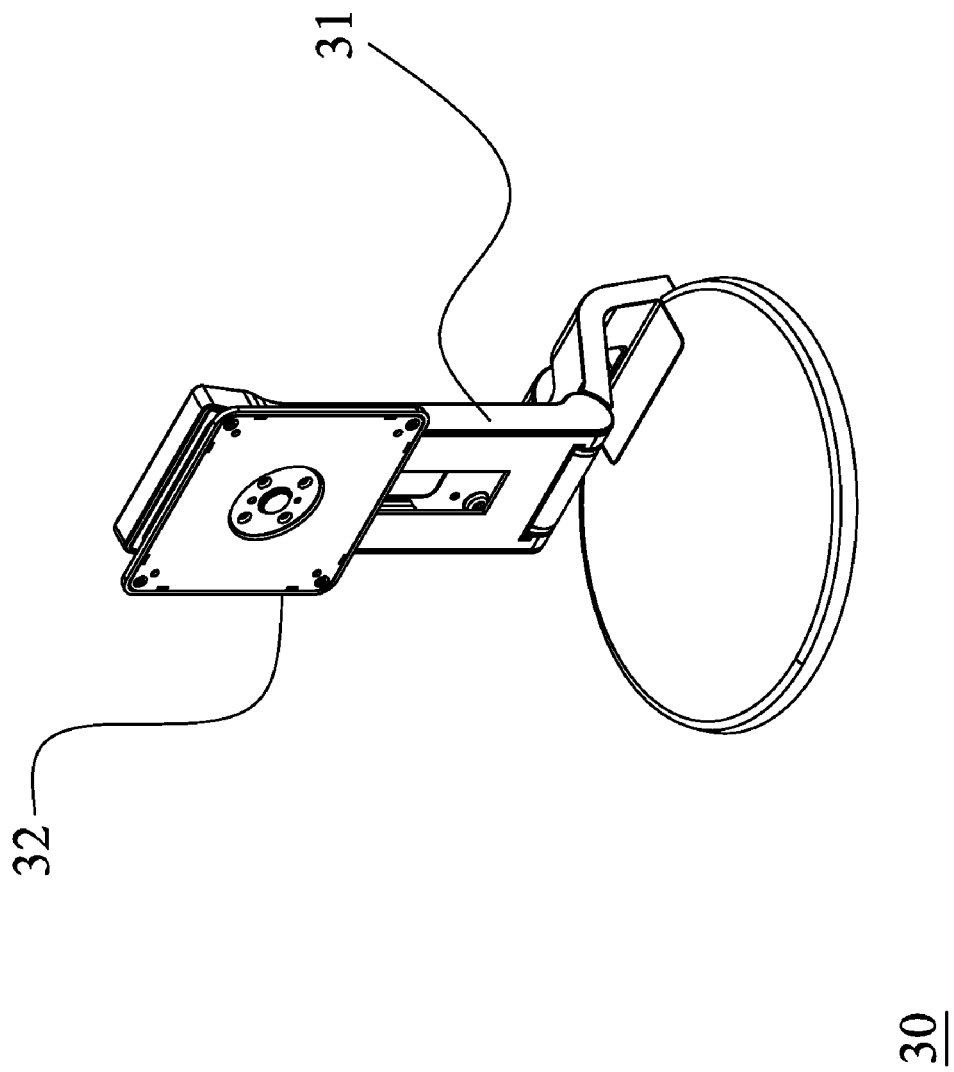
FIG. 2 is a perspective view of a height adjustable base of a liquid crystal panel of the liquid crystal display shown in FIG. 1.
Figure 3:
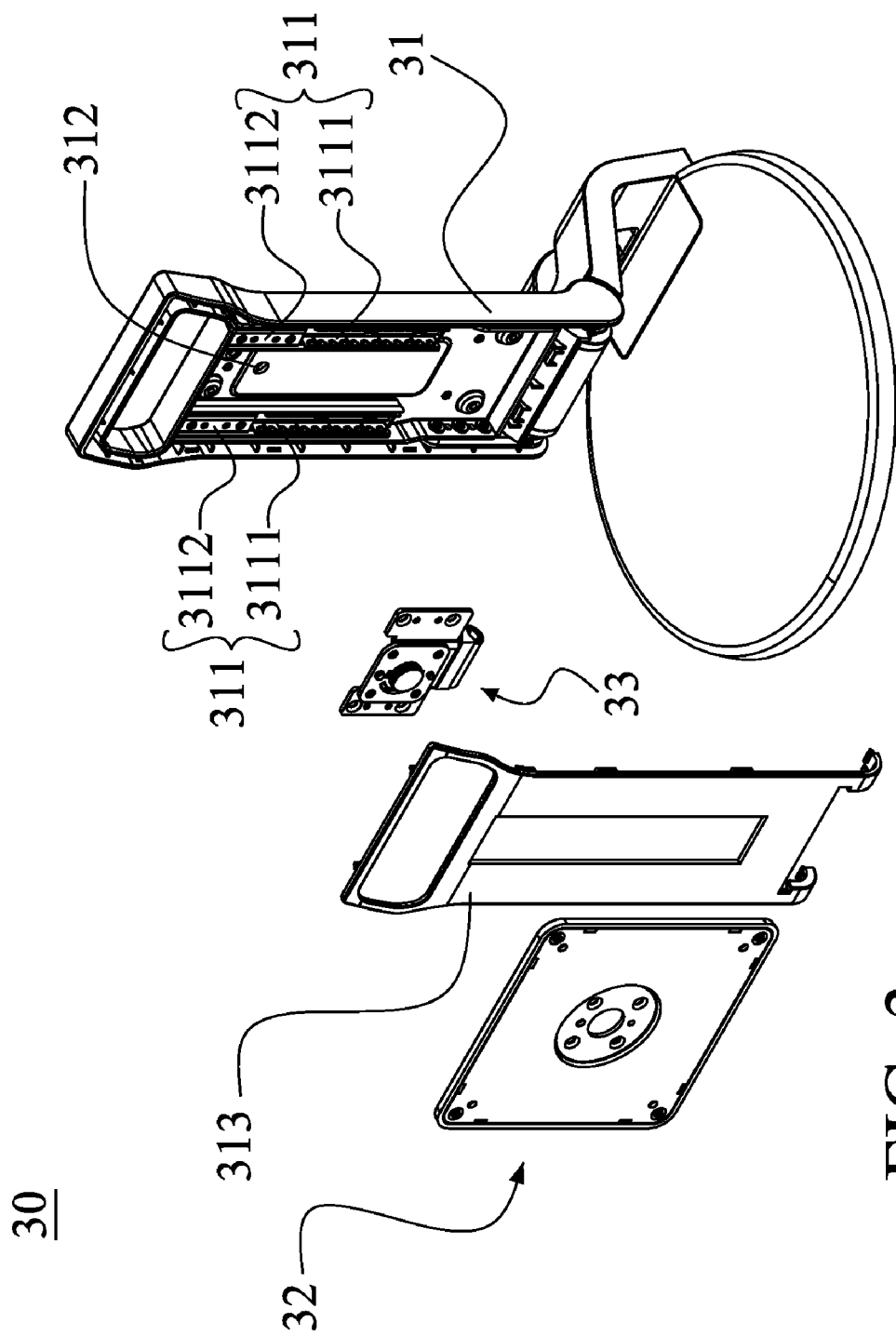
FIG. 3 is a partly exploded perspective view of the height adjustable base shown in FIG. 2.
Figure 4:
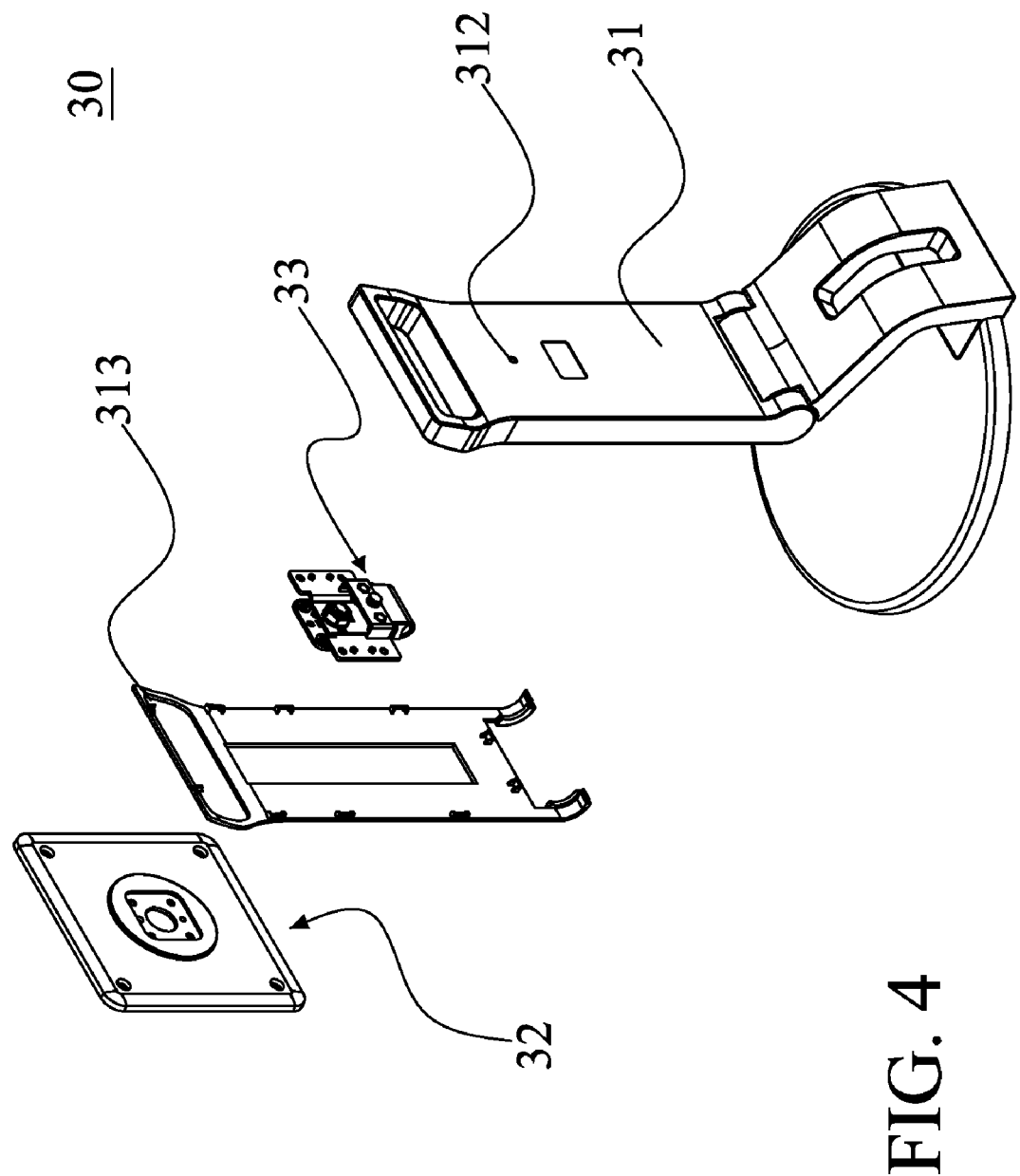
FIG. 4 is a partly exploded perspective view of the height adjustable base along a direction opposite to FIG. 3.

Referring to FIGS. 1 to 7, the preferred embodiment of a liquid crystal display 10 according to the present invention are illustrated. The liquid crystal display 10 includes a liquid crystal panel 20 and a height adjustable base 30. The height adjustable base 30 is composed of a main base 31, a fixing frame 32 and an elastic locating device 33. The main base 31 has a front cover 313 for enhancing the liquid crystal panel 20. The liquid crystal panel 20 is attached to the fixing frame 32 of the height adjustable base 30 with screws 21.

Figure 5:
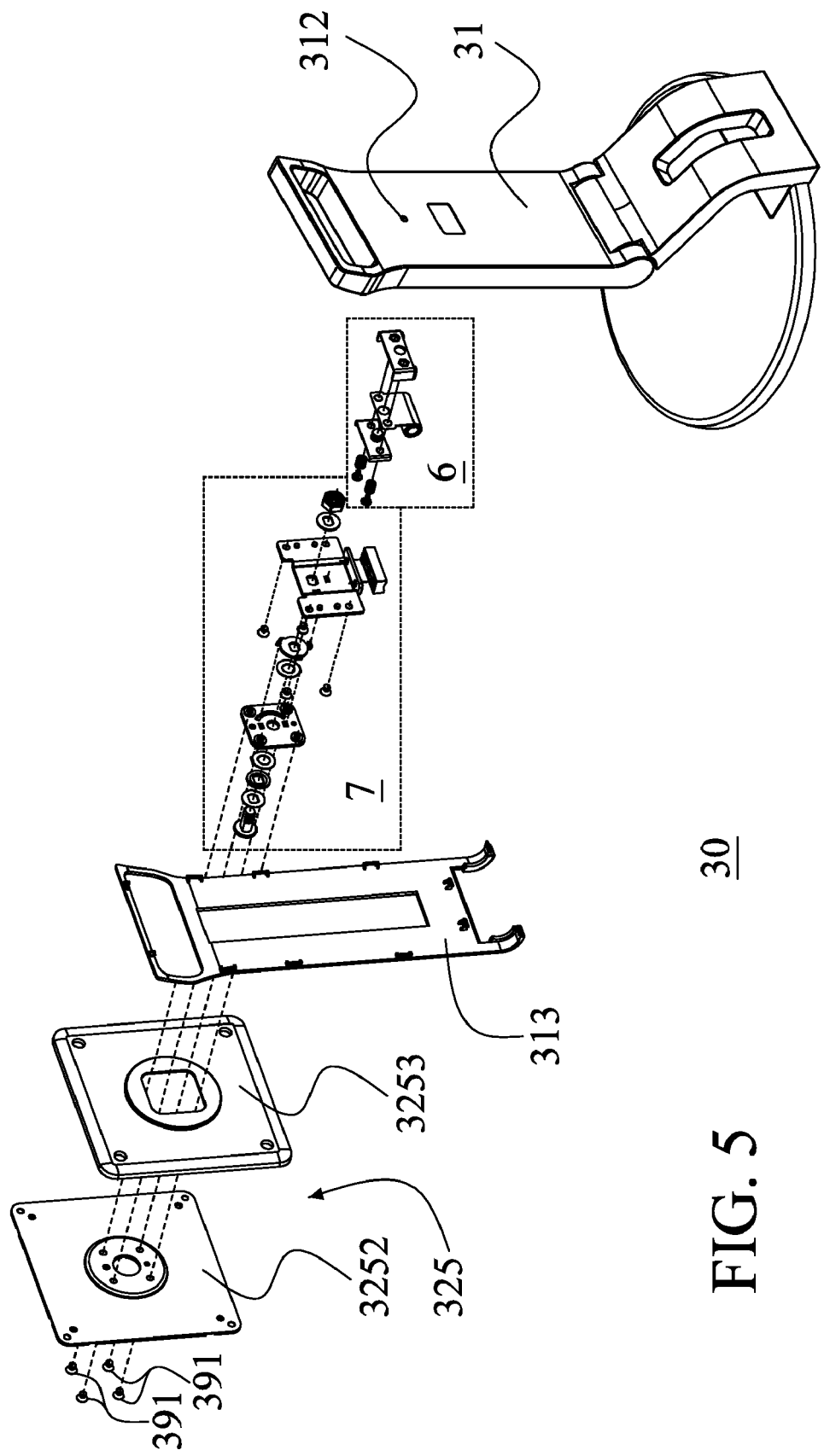
FIG. 5 is a further exploded perspective view of the height adjustable base shown in FIG. 4.
Figure 6:
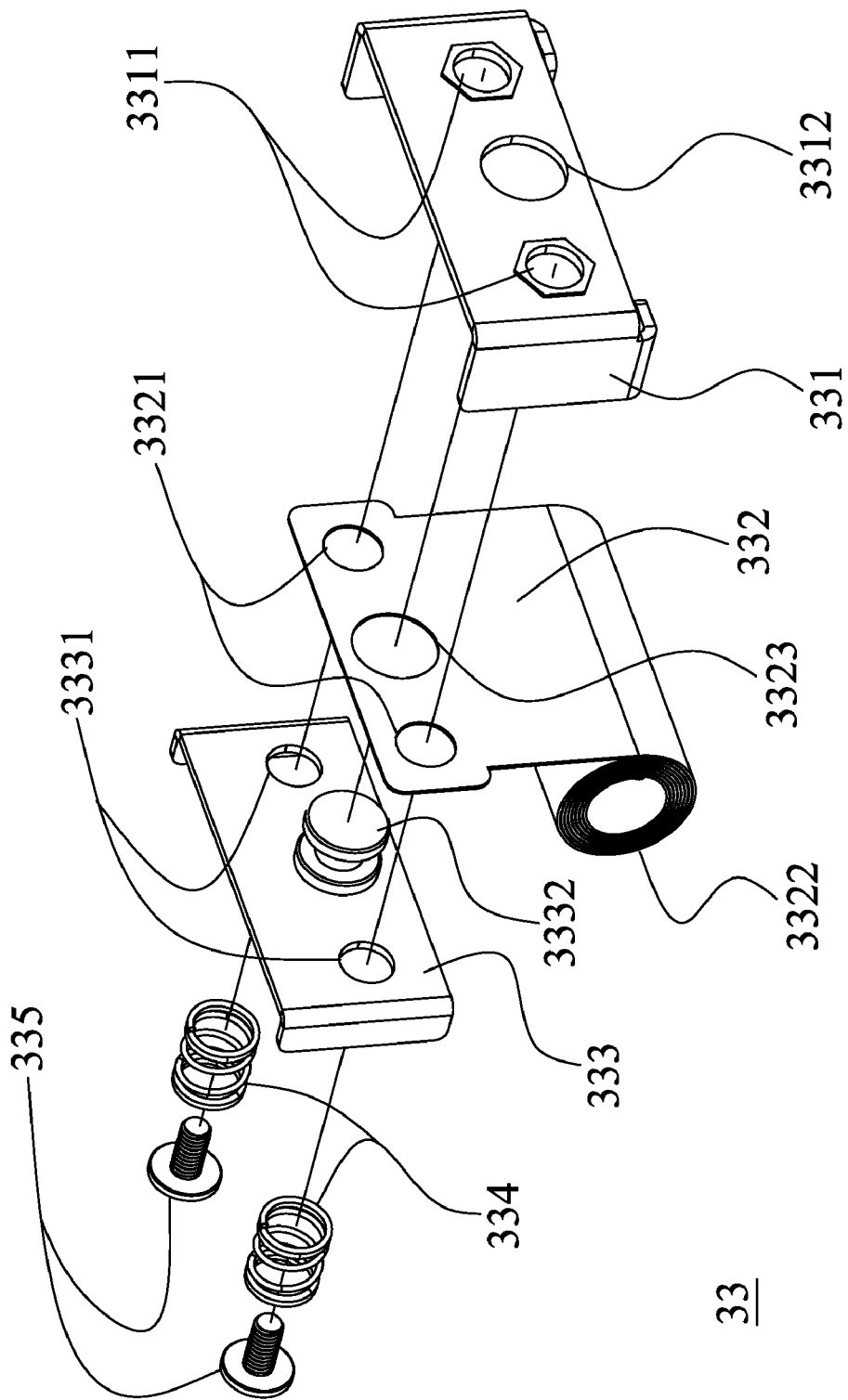
FIG. 6 is an enlarged perspective view of portion 6 shown in FIG. 5.
Figure 7:
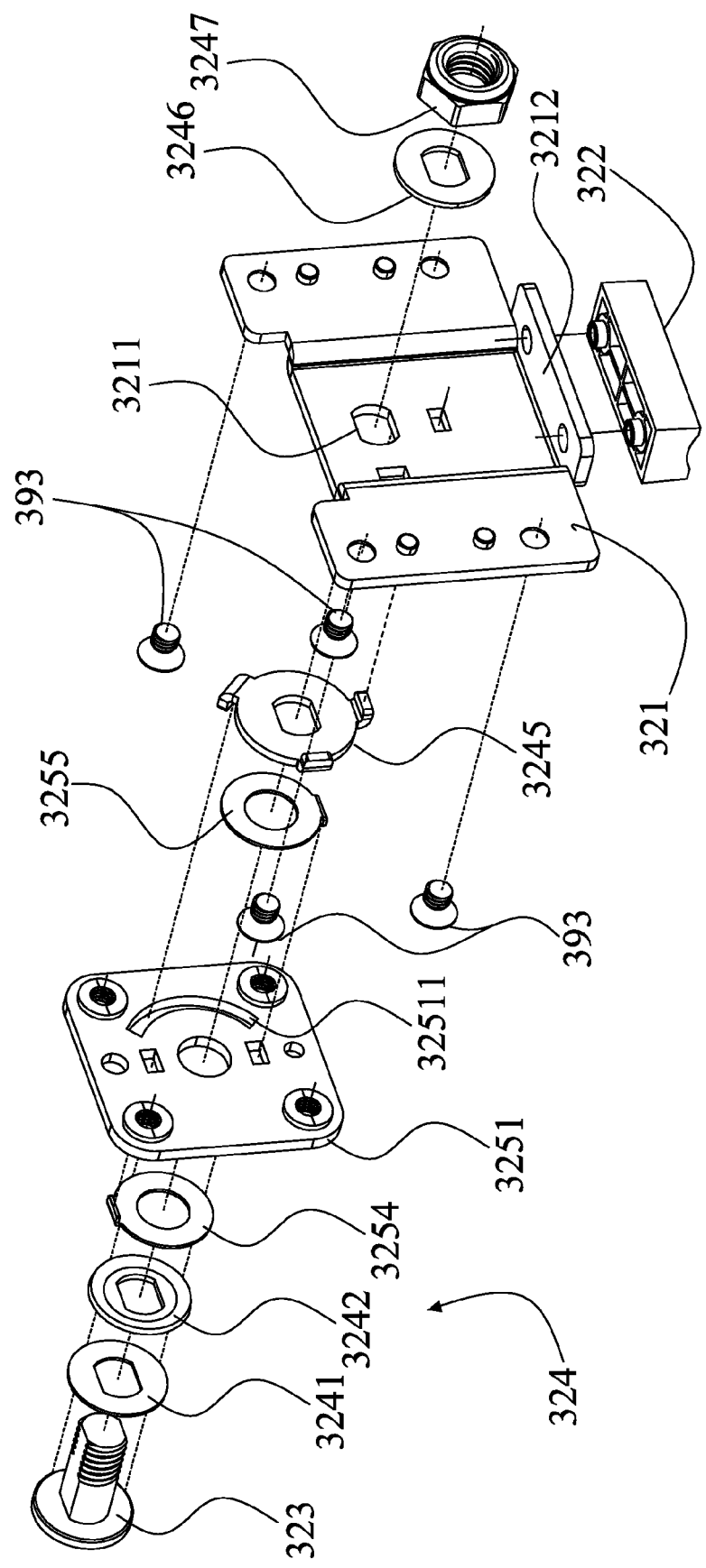
FIG. 7 is an enlarged perspective view of portion 7 shown in FIG. 5.

Referring to FIG. 3 again, the main base 31 has two longitudinal slide rails 311, which each consist of a stationary member 3111 attached to the main base 31 and a movable member 3112. The movable member 3112 is capable of sliding on a plurality of steel balls arranged at the stationary member 3111. Referring to FIGS. 5 to 7, the fixing frame 32 further includes a frame member 321, a spring locating seat 322, a shaft 323, a brake device 324 which is composed of two plain washers 3241, 3246, a spring washer 3242, a panel-angular-positioning washer 3245 and a nut 3247, and a fixing plate member 325 which is composed of a panel rotating base 3251, two wearable washers 3254, 3255, a panel member 3252 and a panel cover member 3253. The elastic locating device 33 further includes a spring force releasing base 331, a locating sheet spring 332, a sliding pin base 333, two coil springs 334 and two screws 335.

While assembling the liquid crystal display 10, the respective screw 335 passes through the respective coil spring 334, the respective base hole 3331 of the sliding pin base 333, the respective side hole 3321 at the joining end of the locating sheet spring 332 to engage with the respective screw holes of the spring force releasing base 331. Then, the acting end 3322 of the locating sheet spring 332 is placed to contact the lower end of the locating spring base 331 and both the sliding pin base 333 and the spring force releasing base 331 contact the lower platform 3212 of the frame member 321 with the lower sides thereof respectively such that the elastic locating device 33 can be joined to the frame member 321 by means of the scrolling elastic ascending force of the locating sheet spring 332 (see FIG. 4). Because the spring locating seat 322 is attached to the lower side of the frame member 321 and the frame member 321 is fastened to the movable member 3112 of the respective slide rail 311 with the screws 393, the frame member 321 and the spring locating seat 322 are capable of moving upward or downward with movable members 3112.

When the frame member 321 is operated to move upward to the top of the main base 31, the sliding pin base 333 is urged by the spring forces of the coil springs 334 to move toward the main base 31. In this way, a locating pin 3332, which is disposed at the sliding pin base 333, passes through a middle hole 3323 of the locating sheet spring 332 and a through hole 3312 of the locating spring base 331 to detachably connect with an engaging hole 312 disposed at the main base 31 (See FIGS. 5 and 6).

Meanwhile, when the fixing frame 32 is operated to move downward, the locating pin 3332, which is disposed at the joining end of the elastic locating device 33, is incapable of moving with the descending fixing frame 32 because the locating pin 3332 is joined to the engaging hole 312 such that the spring locating seat 322 is pushed to extend the acting end 3322 of the locating sheet spring 332 and is positioned under a condition of an elastic ascending force resulting from the winding locating sheet spring 332 being in a state of equilibrium with the gravity resulting from the liquid crystal panel 20. When the user operates to ascend or descend the liquid crystal panel 20 with an upward or downward force being exerted till the liquid crystal panel 20 being disposed at a proper position, the liquid crystal panel 20 is capable of staying at the new elevation with a new equilibrium between the elastic ascending force and the gravity.

Besides, when the liquid crystal display 10 is packed, the locating pin 3332 of the elastic locating device 33 can be disengaged from the engaging hole 312 of the main base 31 with a tool. Meanwhile, the liquid crystal panel 20 being operated to move upward or downward causes the frame member 321 to move upward or downward along with the fixing frame 32 of the liquid crystal panel 20 and the entire elastic locating device 33 is capable of moving with the frame member 321. In this way, the elastic ascending force resulting from the locating sheet spring 332 can be released to prevent the liquid crystal panel 20 from bouncing out accidentally to hurt people at the time of the liquid crystal display being unpacked.

When the liquid crystal display 10 is unpacked, the liquid crystal panel 20 can be operated to an engaging position for the locating pin 3332 of the locating elastic locating device 33 aligning with the engaging hole 312 of the main base 31 such that the locating pin 3332 can be pushed into the engaging hole 312 with the elastic forces of the coil springs 334 of the elastic locating device 33 for engaging with the main base 31 and restoring the function of lifting the liquid crystal panel automatically.

In addition to the locating pin 3332 and the engaging hole 312 being employed to constitute a lifted operating mechanism in association with the locating sheet spring 332 and perform the functions of releasing the torsion and restoring the elastic ascending force automatically, the frame member 321 of the height adjustable base 30 is further capable of allowing the liquid crystal panel 20 to be angularly adjustable based on the preference of the user and the further detail will be explained hereinafter.

As the foregoing, the frame member 321 on the fixing frame 32 is attached to the movable member 3112 with the screws 393 for enabling the lifted operation. In order to allow the liquid crystal panel 20 to be adjusted angularly, the shaft 323 is arranged to pass through the plain washer 3241, the spring washer 3242, the wearable washer 3254, the panel rotating base 3251, the wearable washer 3255, the panel-angular-positioning washer 3245, the stop-rotation shaft hole 3211 of the frame member 321 and the plain washer 3246 sequentially so as to engage with the nut 3247 such that a rotary mechanism is constituted with a rotating shaft assembly formed of the panel rotary base 3251 being associated with shaft 323 turning with respect to the frame member 321 and being braked with the braking device 324 formed of the washers 3241, 3246, the spring washer 3242, the panel-angular-positioning washer 3245 and the nut 3247.

The angular displacement of the liquid crystal panel 20 with respect to the frame member 321 is restricted by the arc grooves 32511 of the panel rotating base 3251. The panel member 3252 and the panel cover member 3253 are fastened to the panel rotating base 3251 with the screws 391 to constitute the fixing plate 325 for assembling the liquid crystal panel 20.

Although the preceding elastic locating device 33 includes the spring force releasing base 331, the locating sheet spring 332, the sliding pin base 333, the two coil springs 334 and the two screws 335 to perform the functions of releasing the torsion of the locating sheet spring 332 and restoring the elastic ascending force automatically with the locating pin 3332 and the engaging hole 312, it is noted that art related to the elastic ascending force of the main base 31 and the locating sheet spring 332 can be achieved with alternatives done by the persons familiar to the skill of the art.

For instance, the locating pin 3332 can be changed to a transverse rod associated with a transverse joining hole; the engaging hole 312 or the engaging groove is arranged on the locating sheet spring 332; and the main base 31 provides an elastic locating device to supply the elastic force for engaging or releasing the joining end of the locating sheet spring 332 and performing the functions of releasing the torsion of the locating sheet spring 332 and restoring the elastic ascending force automatically.

Furthermore, although the preceding fixing frame 32 has the brake device 324, which includes the washers 3241, 3246, the spring washer 3242, the panel-angular-positioning washer 3245 and the nut 3247 and the fixing plate 325, which consists of the panel rotating base 3251, the wearable washers 3254, 3255, the panel member 3252 and the panel cover member 3253, in association with the frame member 321, the spring locating seat 322 and the shaft 323, it is noted that any fixing frames, which are capable of fastening the liquid crystal panel 20 and moving along with the movable member 3112 of the sliding rails 311, instead of the fixing frame 32 can be made by persons who skill in the art.

While the invention has been described with referencing to preferred embodiment thereof, it is to be understood that modifications or variations may be easily made without departing from the spirit of this invention, which is defined by the appended claims.

What is claimed is:

1. A liquid crystal display comprising:
    a liquid crystal panel;
    a main base providing at least a sliding rail having a stationary member attached to said main base and a movable member sliding along said stationary member;
    a fixing frame being joined to said movable member and being mounted with said liquid crystal panel; and
    means for supplying an elastic ascending force to said fixing frame and restoring said elastic ascending force automatically providing an acting end being disposed against said fixing frame, and a joining end being detachably connected to said main base.

2. The liquid crystal display as defined in claim 1, wherein said fixing frame further comprises:
    a frame member being fastened to said movable member with a stop-rotation shaft hole;
    a spring locating seat being attached to a lower side of said frame member to join to the acting end of said means;
    a shaft passing through said stop-rotation shaft hole to connect with said frame member;
    a brake device being disposed next to said frame member and composed of two plain washers, a spring washer, a panel-angular-positioning washer and a nut; and
    a fixing plate member being composed of a panel rotating base, two wearable washers, a panel member and a panel cover member, and being braked with said brake device and rotationally connected to said shaft.

3. The liquid crystal display as defined in claim 1, wherein said main base has an engaging hole and the means is performed with an elastic locating device; wherein the elastic locating device further comprises:
    a spring force releasing base with a central through hole and two threaded holes;
    a locating sheet spring, which supplies the elastic ascending force, having an end being the acting end and another end being the joining end with a middle hole and two side holes at said joining end;
    a sliding pin base providing a locating pin and two base holes;
    two coil springs supplying an elastic coupling force; and
    two screws passing through said coil springs, said two base holes, and said two side holes sequentially so as to engage with said threaded holes respectively;
    wherein, said locating pin passes through said middle hole, and said central through hole so as to engage with said engaging hole and connect with said main base.

4. A height adjustable base for a liquid crystal panel comprising:
    a main base providing at least a sliding rail having a stationary member attached to said main base and a movable member sliding along said stationary member;
    a fixing frame being joined to said movable member and being mounted with said liquid crystal panel; and
    means for supplying an elastic ascending force to said fixing frame and restoring said elastic ascending force automatically providing an acting end being disposed against said fixing frame, and a joining end being detachably connected to said main base.

5. The height adjustable base as defined in claim 4, wherein said fixing frame further comprises:
    a frame member being fastened to said movable member with a stop-rotation shaft hole;
    a spring locating seat being attached to a lower side of said frame member for being joined to the acting end of said means;
    a shaft passing through said stop-rotation shaft hole to connect with said frame member;
    a brake device being disposed next to said frame member and composed of two plain washers, a spring washer, a panel-angular-positioning washer and a nut; and
    a fixing plate member being composed of a panel rotating base, two wearable washers, a panel member and a panel cover member, and being braked with said brake device and rotationally connected to said shaft.

6. The height adjustable base as defined in claim 4, wherein said main base has an engaging hole and the means is performed with an elastic locating device; wherein the elastic locating device further comprises:
    a spring force releasing base with a central through hole and two threaded holes;
    a locating sheet spring, which supplies the elastic ascending force, having an end being the acting end and another end being the joining end with a middle hole and two side holes at said joining end;
    a sliding pin base providing a locating pin and two base holes;
    two coil springs supplying an elastic coupling force; and
    two screws passing through said coil springs, said two base holes, and said two side holes sequentially so as to engage with said holes respectively;
    wherein, said locating pin passes through said middle hole, and said central through hole so as to engage with said engaging hole and connect with said main base.

* * * * *